US009529857B1

(12) United States Patent
Myllymaki

(10) Patent No.: US 9,529,857 B1
(45) Date of Patent: Dec. 27, 2016

(54) DISAMBIGUATION OF PLACE GEOMETRY

(71) Applicant: Google Inc., Mountain View, CA (US)

(72) Inventor: Jussi Petri Myllymaki, Espoo (FI)

(73) Assignee: Google Inc., Mountain View, CA (US)

( * ) Notice: Subject to any disclaimer, the term of this patent is extended or adjusted under 35 U.S.C. 154(b) by 411 days.

(21) Appl. No.: 14/171,689

(22) Filed: Feb. 3, 2014

(51) Int. Cl.
*G06F 17/30* (2006.01)

(52) U.S. Cl.
CPC ..... *G06F 17/3053* (2013.01); *G06F 17/30241* (2013.01)

(58) Field of Classification Search
CPC ............ G06F 17/30241; G06F 17/30259; G06F 17/30265; G06F 17/3053; G06F 17/3087
See application file for complete search history.

(56) References Cited

U.S. PATENT DOCUMENTS

| 5,586,254 | A | * | 12/1996 | Kondo | H04L 41/0677 370/254 |
| 5,884,218 | A | * | 3/1999 | Nimura | G08G 1/0969 340/995.1 |
| 5,908,465 | A | * | 6/1999 | Ito | G01C 21/3614 340/995.27 |
| 7,135,994 | B2 | * | 11/2006 | Kamikawa | G01C 21/3647 340/995.14 |
| 8,682,064 | B2 | * | 3/2014 | Yagyuu | G06T 7/2053 382/113 |
| 2001/0016063 | A1 | | 8/2001 | Albeck et al. | |
| 2002/0059211 | A1 | * | 5/2002 | Kuramochi | G06Q 10/06 |
| 2002/0061132 | A1 | * | 5/2002 | Furukawa | G06K 9/0063 382/154 |
| 2008/0312817 | A1 | * | 12/2008 | Kawauchi | G01C 21/3611 701/533 |
| 2014/0328544 | A1 | * | 11/2014 | Wang | G06K 9/6202 382/203 |
| 2015/0134690 | A1 | * | 5/2015 | McClendon | H04W 4/043 707/769 |
| 2015/0154267 | A1 | * | 6/2015 | Bailiang | G06F 17/30554 707/722 |
| 2015/0156073 | A1 | * | 6/2015 | Bailiang | H04W 4/043 715/736 |

FOREIGN PATENT DOCUMENTS

WO          2013022804 A1     2/2013

* cited by examiner

*Primary Examiner* — James E Richardson
(74) *Attorney, Agent, or Firm* — Dority & Manning, P.A.

(57) ABSTRACT

A method is provided for determining a true geometry of a point of interest including identifying one or more geometries associated with one or more places according to one or more relationships, generating a candidate set of geometries for a first place of the one or more places including one or more candidate geometries including one or more of the one or more geometries being associated with the first place according to the one or more relationships, ranking the one or more candidate geometries of the candidate set according to a ranking criteria, where the ranking sorts the one or more candidate geometries according to the likelihood of a candidate geometry to be the true geometry of the place and selecting a first candidate geometry of the one or more candidate geometries of the candidate set as the true geometry for the first place according to the ranking.

19 Claims, 5 Drawing Sheets

DISAMBIGUATION OF PLACE GEOMETRY

BACKGROUND

A point of interest ("POI") is a feature on a map (or in a geo dataset) that occupies a particular point, as opposed to linear features like roads or areas of land use. A point of interest may be associated with a physical address defining the location of the point of interest within a map (e.g., a 2D map) and geometry information defining the characteristics of the point of interest in a 3D space.

SUMMARY

The disclosed subject matter relates to a machine-implemented method for determining a true geometry of a point of interest (POI), the method comprising identifying, using one or more computing devices, one or more geometries associated with one or more places according to one or more relationships. The method may further include generating, using one or more computing devices, a candidate set of geometries for a first place of the one or more places, the candidate set of geometry including one or more candidate geometries, wherein the one or more candidate geometries include one or more of the one or more geometries being associated with the first place according to the one or more relationships. The method may further include ranking, using one or more computing devices, the one or more candidate geometries of the candidate set according to a ranking criteria, wherein the ranking sorts the one or more candidate geometries according to the likelihood of a candidate geometry to be the true geometry of the place. The method may further include selecting, using one or more computing devices, a first candidate geometry of the one or more candidate geometries of the candidate set as the true geometry for the first place according to the ranking.

The disclosed subject matter also relates to a system for determining a true geometry of a point of interest (POI), the system comprising one or more processors and a machine-readable medium comprising instructions stored therein, which when executed by the processors, cause the processors to perform operations. The operations may include identifying a candidate set of geometries for a first place of the one or more places, the candidate set of geometry including one or more candidate geometries being associated with the first place according to one or more relationships. The operations may further include ranking the one or more candidate geometries of the candidate set according to ranking criteria, wherein the ranking sorts the one or more candidate geometries according to the likelihood of a candidate geometry to be the true geometry of the place. The operations may further include selecting a first candidate geometry of the one or more candidate geometries of the candidate set as the true geometry for the first place according to the ranking.

The disclosed subject matter also relates to a machine-readable medium comprising instructions stored therein, which when executed by a machine, cause the machine to perform operations comprising identifying, using one or more computing devices, one or more geometries association with one or more places according to one or more relationships. The operations may further include generating, using one or more computing devices, a candidate set of geometries for a first place of the one or more places, the candidate set of geometry including one or more candidate geometries, wherein the one or more candidate geometries include one or more of the one or more geometries being associated with the first place according to the one or more relationships. The operations may further include ranking, using one or more computing devices, the one or more candidate geometries of the candidate set according to a ranking criteria, wherein the ranking sorts the one or more candidate geometries according to the likelihood of a candidate geometry to be the true geometry of the place. The operations may further include selecting, using one or more computing devices, a first candidate geometry of the one or more candidate geometries of the candidate set as the true geometry for the first place according to the ranking. The operations may further include storing, using one or more computing devices, the first candidate geometry in association with the first place.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
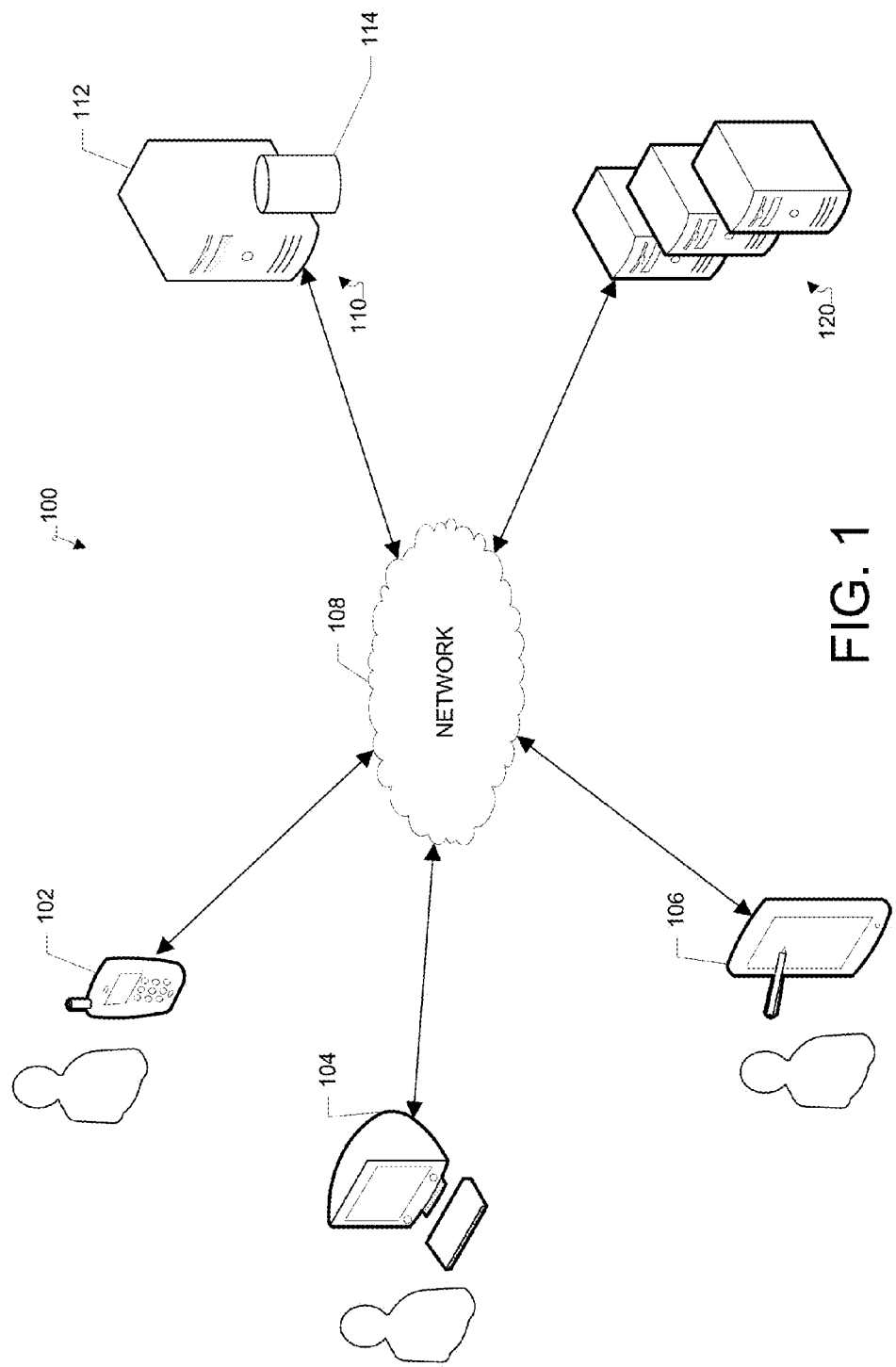
FIG. 1 illustrates an example client-server network environment which provides for determining true geometry (e.g., building outline) of a POI feature from existing geo data.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

A point of interest ("POI") is a feature on a map (or in a geo dataset) that occupies a particular point (e.g., as opposed to linear features like roads or areas of land use). A POI may be associated with a physical address defining the location of the point of interest and geometry information defining the characteristics of the point of interest.

The present disclosure provides a method and system for determining the geometry (building outline) of a POI feature (e.g. store or mall) using existing geo data. The mapping of information regarding the geometry of a POI with the POI is done according to one of an "occupies" and "is-contained-by" relationships. An "occupies" relationship is a declaration that a POI occupies a particular physical space, e.g. a standalone building or a section of a larger building. In some implementations, the "occupies" relationship may be an explicit declaration. An "is-contained-by" relationship may be inferred and means that a POI (or its center coordinates) is simply contained inside a geometry feature. In many cases, but not always, that simple containment is sufficient to infer that the POI feature has that geometry.

In some instances a POI may have an occupies or is-contained-by relationship with multiple geometries. Thus, it may be difficult to determine the actual geometry of the POI. For instance, a store may be contained by the geometry representing a section of a building as well as the geometry of the entire building. If the store is in a shopping mall, then a section of a building is the right geometry to use. However, if the store operates out of a standalone building, then the correct geometry is the building geometry.

In some examples, manual (human conducted) indoor mapping surveys may be performed to record POI-to-geometry associations. Similarly, geo data errors may be corrected manually when they are discovered. Such manual solutions for disambiguation of the geo data are not scalable. According, the present disclosure provides for automatic disambiguation of the geo data to determine a correct geometry for each POI.

Geo data including places (e.g., POIs), geometries, and relationships connecting the places and geometries for those places may be stored in one or more geo databases. The relationship defines geometries with respect to a place either in terms of an occupies relationship or an is-contained-by relationship.

For each place a candidate set of place-to-geometry associations may be generated by identifying geometries read from the geo database having an occupies or is-contained-by relationships with the place. In one example, for self-describing places (e.g., a place that also contains the coordinates of the outline of the physical space the place occupies), the outline coordinates of the place are also translated to a place to geometry relationship and added to the candidate set. As a result, each place is associated with a candidate set of possible geometries.

Each candidate geometry of the set may be associated with a global occupancy count which refers to the places that are associated with the geometry (e.g., a mall may have a global occupancy count equal to the number of stores within the mall).

The candidate geometries for the set are sorted in the order of the most likely geometry to represent the place, referred to as the true geometry of the place, to the least likely. The sorting may for example be performed according to various sorting criteria. The criteria may define rules that compare each pair of candidate geometries (e.g., a first candidate geometry and second candidate geometry of the candidate set) and returns the candidate geometry that is more likely to be the true geometry.

For each comparison, the criteria may include for example, whether the candidate geometry is extracted from a self-describing place (e.g., a candidate geometry is defined as being more likely to be the true geometry if the candidate geometry is extracted from a self-describing place), name similarity of the candidate geometry and place (e.g., the candidate geometry is more likely to be a true geometry if it has a name similarity with the place that is above a certain threshold), the relationship type of the candidate geometry and place (e.g., if the relationship is an occupies relationship rather than a is-contained-relationship), global occupancy count of the candidate geometry (e.g., lower global occupancy count indicates a higher likelihood), geometry type of the candidate geometry, such as section, building, grounds, (e.g., the larger type indicates higher likelihood), distance from the coordinates associated with the candidate geometry to the place (e.g., closer proximity indicates higher likelihood) and/or the unique identifier associated with the candidate geometry (e.g., alphabetical sorting).

Once the sorting is completed, the highest ranked candidate geometry is selected as the true geometry for a place and an association is generated. The association may then be stored in a database as the unambiguous mapping of the place to its geometry.

II. Example Client-Server Network Environments for Determining POI Geometry Based on Existing Geo Data FIG. 1 illustrates an example client-server network environment which provides for determining true geometry (e.g., building outline) of a POI feature from existing geo data. A network environment 100 includes a number of electronic devices 102, 104 and 106 communicably connected to a server 110 by a network 108. One or more remote servers 120 are further coupled to the server 110 and/or the one or more electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In one example, the electronic devices 102, 104 and 106 store a User agent such as a browser or application. In the example of FIG. 1, electronic device 102 is depicted as a smartphone, electronic device 104 is depicted as a desktop computer, and electronic device 106 is depicted as a PDA.

Server 110 includes a processing device 112 and a data store 114. Processing device 112 executes computer instructions stored in data store 114, for example, to assist in selecting the most relevant geometry (e.g., building outline) of a POI feature from existing geo data. In some examples, server 110 may host the system for identifying candidate geometry for a POI, sorting the candidate geometry and selecting a candidate geometry as the true geometry for the POI. In some example aspects, server 110 can be a single computing device such as a computer server. In other embodiments, server 110 can represent more than one computing device working together to perform the actions of a server computer (e.g., cloud computing). Server 110 may further be in communication with remote servers 120 either through the network 108 or through another network or communication means.

The one or more remote servers 120 may perform various functionalities and/or storage capabilities described herein with regard to the server 110 either alone or in combination with server 110. Server 110 may further maintain or be in communication with data stores hosted on one or more remote server 120 for storing geo data regarding one or more POIs.

Each of the one or more remote servers 120 can be a single computing device such as a computer server or can represent more than one computing device working together to perform the actions of a server computer (e.g., cloud computing). Each of the one or more remote servers 120 may host various services for determining and/or maintaining geo data regarding one or more POIs. In one embodiment server 110 and one or more remote servers 120 may be implemented as a single server hosting services for storing, maintaining and/or accessing geo data and for selecting a true geometry for one or more POIs. In one example, the server 110 and one or more remote servers 120 may communicate through the user agent at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

III. Example Systems for Determining POI Geometry Based on Existing Geo Data

Figure 2:
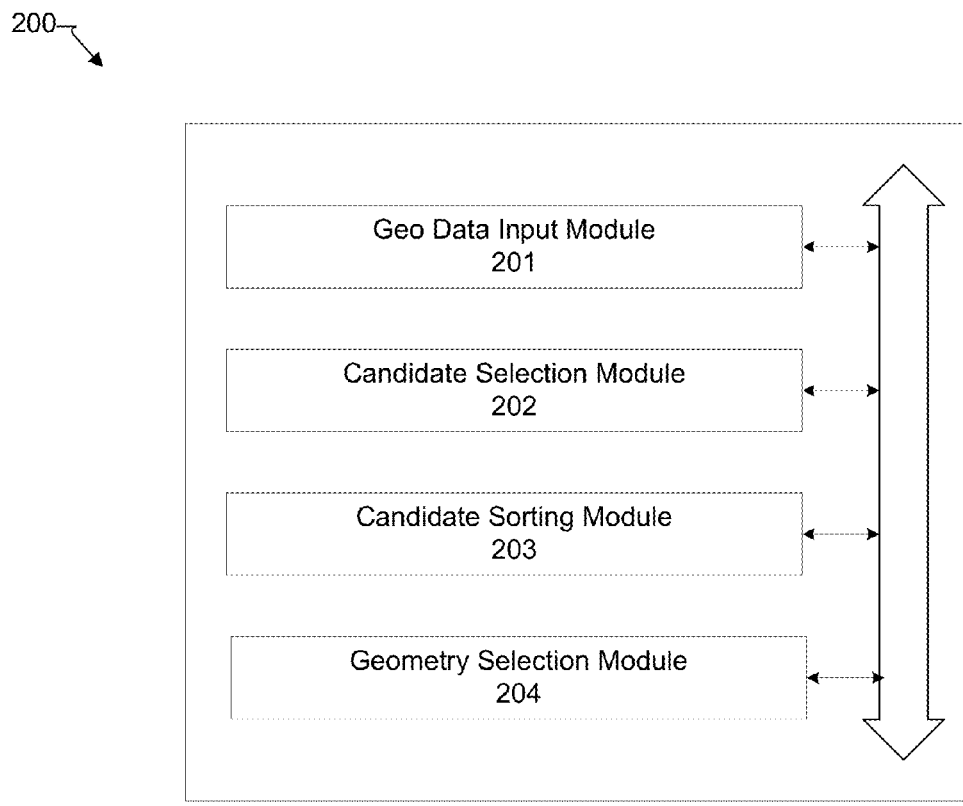
FIG. 2 illustrates an example of a system for determining true geometry of a POI feature from existing geo data.

FIG. 2 illustrates an example of a system 200 for determining true geometry of a POI feature from existing geo data. System 200 includes geo data input module 201, candidate selection module 202, candidate sorting module 203, and geometry selection module 204. These modules, which are in communication with one another, process geo data stored in one or more data stores hosted by or in communication with server 110 and/or one or more remoter servers 120 to determine a true geometry for a POI.

The geo data input module 201 may be configured to request and/or receive geo data including geometries, places and relationships (e.g., mappings) between the places and geometries from one or more databases storing geo data for one or more places. In one example, the geo data input module 201 forwards the geo data to the candidate selection module 202. The candidate selection module 202 identifies a candidate set having an occupies or is-contained-by relationships with the place (e.g., all geometry information mapped to the place by either relationship type) for each of the one or more places. In one example, for self-describing places (e.g., a place that also contains the coordinates of the outline of the physical space the place occupies), the candidate selection module 202 may be further configured to translate the outline coordinates of the place to a geometry mapping and add the translated geometry mapping to the candidate set. As a result, each place is associated with a candidate set of possible geometries.

The candidate sorting module 203 sorts the candidate geometries of the candidate set for each of the one or more places. For example, for each place, the candidate geometries of the candidate set may be ranked in the order of the most likely geometry to represent the place, referred to as the true geometry of the place, to the least likely. The sorting may for example be performed according to various sorting criteria. In one example, the candidate sorting module 203 compares all candidate geometries according to the criteria to determine a ranking of the candidate geometries. For example, the candidate sorting module 203 may compare each pair of candidate geometries (e.g., a first candidate geometry and second candidate geometry of the candidate set) and return the candidate geometry that is more likely to be the true geometry. A sorted list of candidate geometries of the candidate set may be generated according to the comparison.

The geometry selection module 204 selects the true geometry of the place and/or associates the place and its true geometry. The geometry selection module 204 may make the selection based on the sorting performed by the candidate sorting module 203. For example, the geometry selection module 204 may receive the sorted candidate set and may select the highest ranked candidate geometry as the true geometry for a place and an association may generated. The geometry selection module 204 may store the association (e.g., a mapping) in a database as the unambiguous mapping of the place to its geometry.

In some aspects, the modules may be implemented in software (e.g., subroutines and code). The software implementation of the modules may operate on server 110 and/or one or more remote servers 120. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

IV. Example Processes for Determining POI Geometry Based on Existing Geo Data

Figure 3:
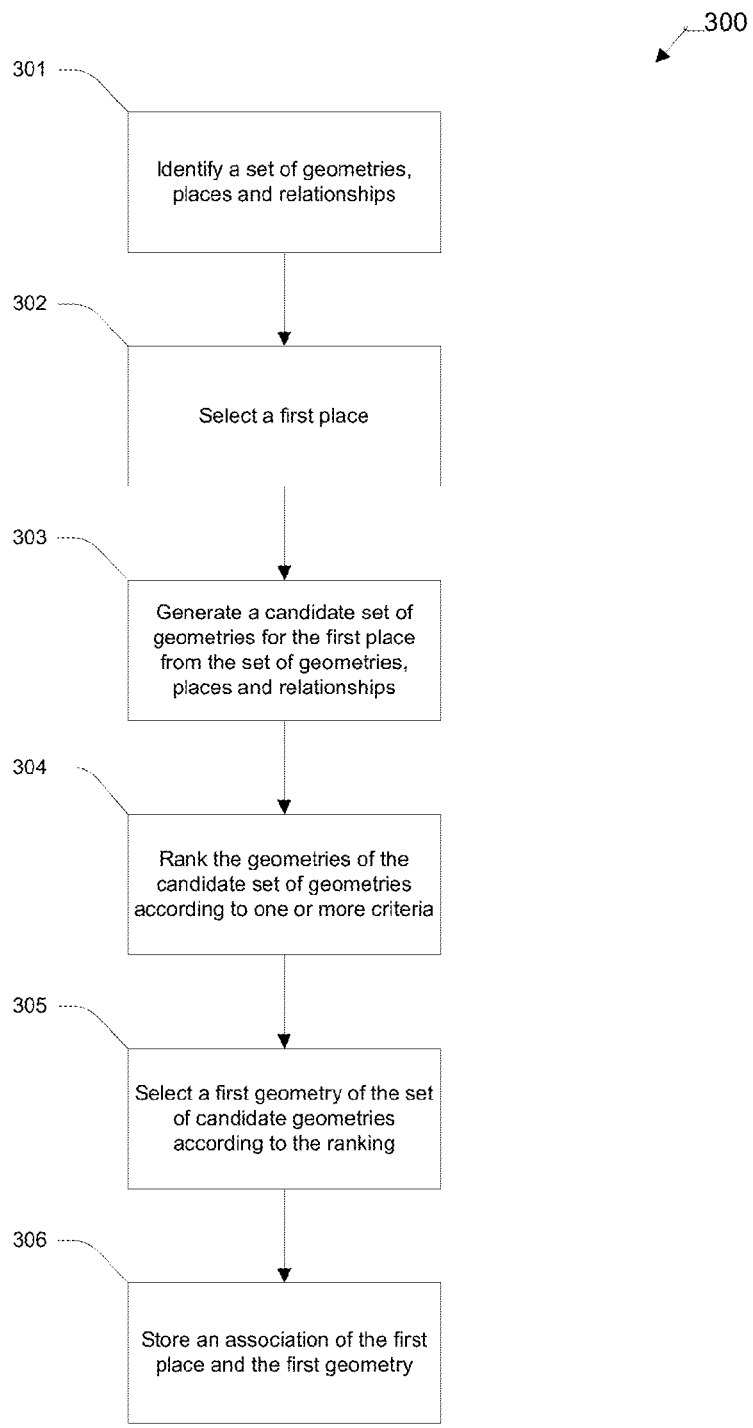
FIG. 3 illustrates a process for determining true geometry of a POI feature from existing geo data.
Figure 4:
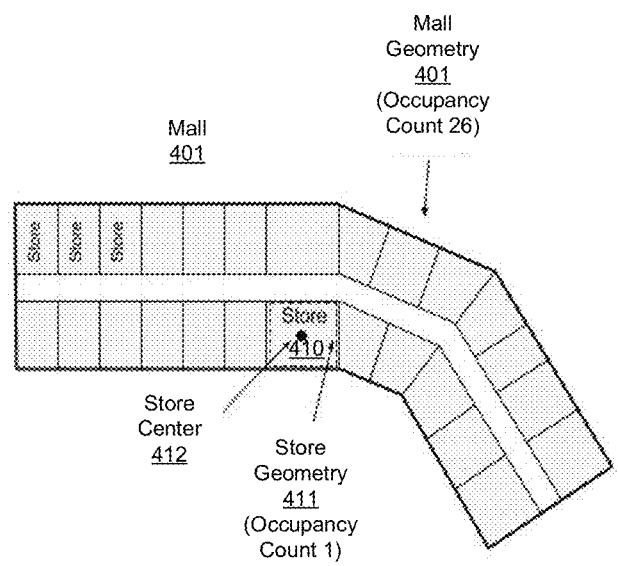
FIG. 4 illustrates an example illustration of geometry information for a first place.

FIG. 3 illustrates a process 300 for determining true geometry of a POI feature from existing geo data. In block 301, a set of geometries, places and relationships (e.g., mappings) between the places and geometries are identified. In some examples, one or more data stores may maintain mappings of place to geometry information. The mapping of a place to geometry information for that place may be done according to "occupies" and "is-contained-by" relationships. In some instances each place may have an occupies or is-contained-by relationship with multiple geometries (and vice-versa). Due to the many to many nature of the mappings, the actual geometry (true geometry) of a place may not be known. For instance, a store may be contained by the geometry representing a section of a building as well as the geometry of the entire building. If the store is in a shopping mall, then a section of a building is the right geometry to use. However, if the store operates out of a standalone building, then the correct geometry is the building geometry. FIG. 4, described in more detail below, illustrates an example layout of a first place (a store) and one or more candidate geometries associated with the store.

In block 302, a first place is selected. In one example, the geo data received in step 301 may include geo data for a plurality of places. To determine the true geometry (e.g., the geometry most likely to be the most accurate representation of the place) for each of the plurality of places, the process begins to process the geometry information for each place. In one example, blocks 302-306 are performed for one or more places to determine a true geometry for each place. The first place selected herein is used as an example place of the plurality of places.

In block 303, a candidate set of place-to-geometry associations may be generated for the first place by identifying geometries having an occupies or is-contained-by relationships with the first place according to the information received in block 301. In one example, in block 303, if it is determined that the first place also contains the coordinates of the outline of the physical space the first place occupies, the first place is identified as a self-describing place, and the outline coordinates of the first place may also be translated to a place to geometry relationship and added to the candidate set. As a result, the first place is associated with a candidate set of possible geometries.

In block 304, the candidate geometries of the candidate set are ranked according to one or more criteria. In one example, the candidate geometries are sorted in the order of the most likely to the least likely geometry to represent the first place.

The criteria may define rules to compare each pair of candidate geometries of the candidate set according to the criteria to select the candidate geometry that is more likely to be the true geometry. The comparison may be performed for pairs of candidate geometries (e.g., all possible pairs) and the sorting may be performed according to the results of the comparison for the pairs. In some examples, a likelihood score may be calculated for each candidate geometry according to the criteria. The comparison and/or sorting of the candidate geometries may be performed according to the likelihood score for each candidate geometry.

The criteria may include, for example, whether the candidate geometry is extracted from a self-describing place. For example, a candidate geometry may be defined as being more likely to be the true geometry if the candidate geometry is extracted from a self-describing place. The criteria may also include name similarity of the candidate geometry and the first place, where the candidate geometry is more likely to be a true geometry if it has a name similarity with the first place that is above a certain threshold.

In one example, the name similarity of a candidate geometry with a place may be determined by processing the name of the candidate geometry and/or place and comparing the names. For example, the name associated with the candidate geometry is identified. In some examples, if the candidate geometry is not associated with a name, the name is treated as an empty string. The name of the candidate geometry and/or place may be normalized for comparison. The normalization may include converting both names to lower case, sorting words in the name in alphabetical order, and/or removing all punctuation. The comparison of the names may be performed by computing the Levenshtein string edit distance between the names. the Levenshtein distance between two words refers to the minimum number of single-character edits (e.g., insertions, deletions or substitutions) required to change one word into the other. The calculated distance may be scaled to a value between 0 and 1 and/or subtracted from 1 to derive a similarity score for a candidate geometry. The more similar the names are, the closer the similarity score is to 1.

The relationship type of the candidate geometry and place (e.g., if the relationship is an occupies relationship rather than a is-contained-by relationship) may also be used as a criteria for comparing the candidate geometries. The occupies relationship is more likely to represent the true geometry of a place compared to a is-contained-by relationship. Furthermore, global occupancy count of the candidate geometry may be used as one of the criteria. Each candidate geometry of the set may be associated with a global occupancy count which refers to the places that are associated with the geometry (e.g., as shown in FIG. 4, a mall may have a global occupancy count equal to the number of stores within the mall). In some examples, lower global occupancy count indicates a higher likelihood that the candidate geometry is the true geometry for a place.

In some implementations, candidate geometry type of the candidate geometry, such as section, building, grounds may also provide an indication of the likelihood that the geometry represents the true geometry of a place, where, for example, the larger type indicates higher likelihood. Another criteria that is used to determine likelihood of the candidate geometry to represent the true geometry of the first place may be the distance from the coordinates associated with the candidate geometry to the first place. That is a geometry with a closer proximity to the first place indicates higher likelihood. In addition, a unique identifier associated with each candidate geometry may be used to sort the candidate geometries. For example, the identifiers may be used for alphabetical sorting (e.g., the identifier that is alphabetically lower is selected as being more likely).

In one example, the comparison of each pair of geometries may be performed according to the above criteria, where some criteria are given higher preference. In one example, weights may be assigned to different criteria to indicate such preference. In some examples, the criteria may be used for comparing the candidate geometries in an order that indicates preference for certain criteria. In one example, the comparison may be performed between a first candidate geometry and a second geometry by first determining if either or both of the geometries are a self-describing geometry. If one of the first and second candidate geometries is a self-describing geometry and the other is not, then the candidate geometry that is the self-describing geometry is returned as the candidate geometry with the higher likelihood to be the true geometry for the first place. Otherwise, if neither or both the first and second candidate geometry are extracted from a self-describing place, the name similarity between each of the first geometry and second geometry and the first place is determined. In one example, a similarity score is determined for each candidate geometry (e.g., according to the edit distance as described above). In one example, if the name similarity between either candidate geometry is higher than a certain threshold, the candidate geometry with the higher likelihood (e.g., score closer to 1) is selected and returned as the more likely geometry. In one example, a difference between the scores may have to meet a certain threshold for the selection of one geometry as the more likely candidate geometry.

If no determination is made based on name similarity, the relationship types of the first and second candidate geometry are determined. If the two candidate geometries have different relationship types, the candidate geometry that has an occupies relationship is selected as the candidate geometry more likely to represent the true geometry of the first place. If the two geometries have the same relationship type with the first place, the global occupancy count for the two candidate geometries is determined. In one example, the candidate geometry with the lower global occupancy count may be selected as the more likely candidate geometry. In some examples, the difference between the global occupancy count of the two candidate geometries is determined. The selection of one candidate geometry as the more likely candidate may be made according to the difference and/or the values of global occupancy count for the two candidate geometries.

If no determination can be made based on the global occupancy count of the two candidate geometries, a geometry type for the first and second candidate geometry is determined. In one example, the geometry type for each geometry may include section, building, ground or other type of geometry. In one example, if it is determined that the two candidate geometries have a different geometry type, the selection may be made according to the size of the geometry type. The size of the geometry types may be defined with ground being the largest, buildings being the second largest and sections being the smallest type. Other geometry types may be defined and placed in the size ranking. In one example, the candidate geometry with the larger type may be selected as the more likely candidate geometry.

If no determination can be made based on the geometry type, a location (e.g., latitude/longitude coordinates) associated with each candidate geometry may be determined. A distance from the determined location to a location associated with the first place (e.g., a center point and/or actual physical location) may be determined. If the two candidate geometries are a different distance from the location of the first place (e.g., a difference that is above a threshold distance or a difference that is a specific ratio of the total distance), the candidate geometry that is closer to the first place may be selected as the more likely geometry to represent the true geometry of the first place.

If no determination is made based on the distance, an identifier for each candidate geometry is identified, and the more likely candidate geometry is selected based on the identifier. For example the candidate geometry that has an alphabetically lower identifier is selected as the more likely candidate geometry.

Based on the comparison, in block 304 a ranked list of candidate geometries of the candidate set is generated.

In block 305, a first candidate geometry of the set of candidate geometries is selected according to the ranking. For example, in some implementations, the highest ranked candidate geometry is selected as the true geometry for the first place. In block 306, an association (e.g., a mapping) of the candidate geometry and the first place is generated and stored. The association may be stored in the database as the unambiguous mapping of the first place to its geometry.

FIG. 4 illustrates an example illustration of geometry information for a first place. The first place may include a store 410 located within a mall 400 having a plurality of stores. As illustrated the first place may be associated with at least two candidate geometries. Each candidate geometry may include the lines connecting the corner points of the geometry (e.g., latitude/longitude coordinates). A first candidate geometry may be the store geometry 411. The store geometry 411 may have an occupies relationship with the store 410. A second candidate geometry associated with the store 410 may be the mall geometry 401. The mall geometry 401 may have an is-contained-by relationship with the store 410. In one example, each candidate geometry 401 and 411 is associated with an occupancy count. For example, the mall geometry 401 is associated with an occupancy count of 26 representing, for example, the number of stores within the geometry, and the store geometry 411 may be associated with the occupancy count 1. A store center 412 of the store may define a location of the store.

V. Example Electronic System for Implementing Determining POI Geometry Based on Existing Geo Data Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
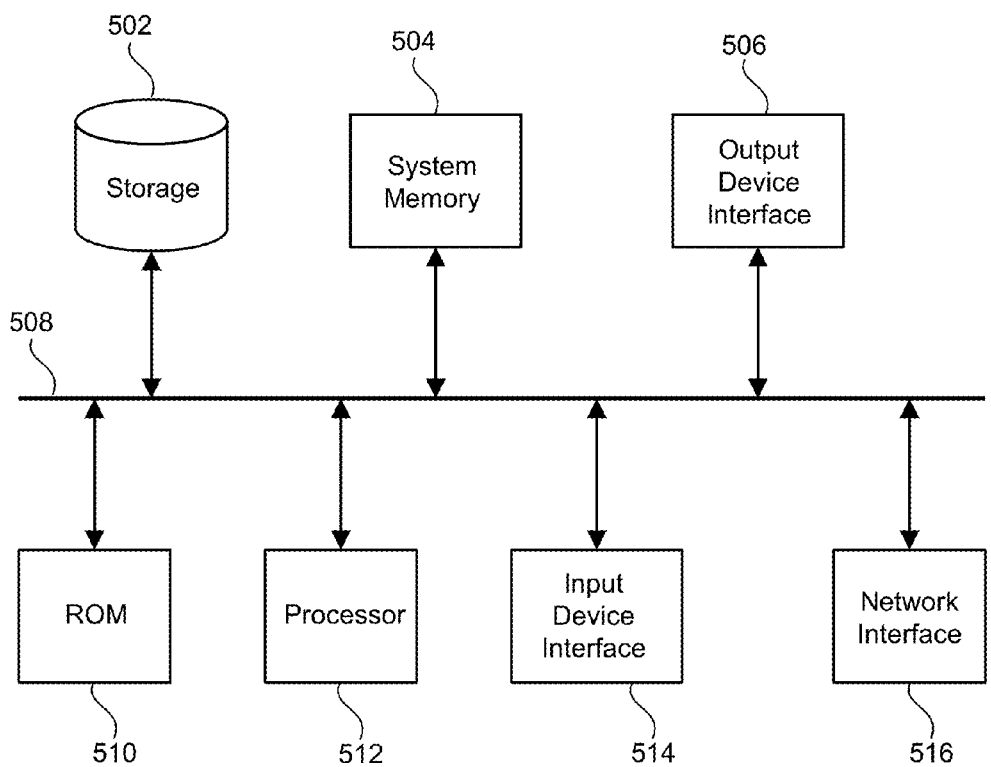
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for determining true geometry of a POI feature from existing geo data according to various embodiments. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for determining a true geometry of a point of interest (POI), the method comprising:

identifying, using one or more computing devices, a plurality of geometries associated with one or more points of interest according to one or more relationships;

generating, using one or more computing devices, a candidate set of geometries for a first point of interest of the one or more points of interest, the candidate set of geometries including at least two candidate geometries that include geometries being associated with the first point of interest according to the one or more relationships;

ranking, using one or more computing devices, the candidate geometries of the candidate set according to a ranking criteria, wherein the ranking sorts the candidate geometries according to the likelihood of the respective candidate geometry to be a true geometry of the first point of interest;

selecting, using one or more computing devices, a first candidate geometry of the candidate geometries of the candidate set as the true geometry for the first point of interest according to the ranking; and storing, using one or more computing devices, the first candidate geometry in association with the first point of interest.

2. The method of claim 1, wherein the one or more relationships comprises an occupies relationship between a geometry of the plurality of geometries and a point of interest of the one or more points of interest, wherein the occupies relationship between the geometry and the point of interest indicates that the point of interest occupies the entirety of the geometry.

3. The method of claim 2, wherein the occupies relationship is an explicit declaration by an owner or other entity familiar with the point of interest.

4. The method of claim 1, wherein the one or more relationships comprises an is-contained-by relationship between the respective geometry and the respective point of interest of the one or more points of interest.

5. The method of claim 4, wherein the is-contained-by relationship indicates that the respective point of interest is contained inside the geometry.

6. The method of claim 4, wherein the is-contained-by relationship is inferred according to geo data.

7. The method of claim 1, wherein the ranking criteria includes an occupancy count for each candidate geometry of the candidate geometries, wherein the occupancy count indicates the number of points of interest of the one or more points of interest being associated with the candidate geometry by the one or more relationships.

8. The method of claim 7, wherein the candidate geometry is more likely to be the true geometry of the first point of interest if the occupancy count of the candidate geometry is smaller than the other candidate geometries.

9. The method of claim 1, wherein the ranking criteria includes a name similarity of each candidate geometry and the first point of interest, wherein a candidate geometry is more likely to be the true geometry of the first point of interest if a name associated with the candidate geometry is more similar to the first point of interest than the other candidate geometries.

10. The method of claim 1, wherein the one or more relationships are one of an occupies or is contained by relationship and wherein a candidate geometry is more likely to be the true geometry of the first point of interest if it is associated with the first point of interest according to an occupies relationship.

11. The method of claim 1, further comprising:
determining that the first point of interest is a self-describing point of interest, wherein a self-describing point of interest is a point of interest that contains coordinates of an outline of the physical space the point of interest occupies;
translating the coordinates of the first point of interest to a translated geometry; and
adding the translated geometry as a candidate geometry to the candidate set of geometries.

12. The method of claim 11, wherein a candidate geometry is more likely to be the true geometry of the first point of interest if it is generated based on the coordinates of the first point of interest.

13. A system for determining a true geometry of a point of interest (POI), the system comprising:
one or more processors; and
a machine-readable medium comprising instructions stored therein, which when executed by the processors, cause the processors to perform operations comprising:
identifying a candidate set of geometries for a first point of interest of one or more points of interest, the candidate set of geometries including at least two candidate geometries being associated with the first point of interest according to one or more relationships;
ranking the candidate geometries of the candidate set according to ranking criteria, wherein the ranking sorts the candidate geometries according to the likelihood of the respective candidate geometry to be the true geometry of the first point of interest; and
selecting a first candidate geometry of the candidate geometries of the candidate set as the true geometry for the first point of interest according to the ranking.

14. The system of claim 13, wherein the ranking criteria include one or more of whether the candidate geometry is extracted from a self-describing point of interest, name similarity of the candidate geometry and the first point of interest, the relationship type of the candidate geometry and the first point of interest, a global occupancy count of the candidate geometry, geometry type of the candidate geometry, distance from the coordinates associated with the candidate geometry to the first point of interest or a unique identifier associated with the candidate geometry.

15. The system of claim 13, wherein the one or more relationships comprises one of an occupies relationship indicating that the first point of interest occupies the candidate geometry or an is-contained-by relationship indicating that the first point of interest is contained inside the candidate geometry.

16. A machine-readable medium comprising instructions stored therein, which when executed by a machine, cause the machine to perform operations comprising:
identifying, using one or more computing devices, a plurality of geometries associated with one or more points of interest according to one or more relationships;
generating, using one or more computing devices, a candidate set of geometries for a first point of interest of the one or more points of interest, the candidate set of geometries including at least two candidate geometries that include geometries being associated with the first point of interest according to the one or more relationships;
ranking, using one or more computing devices, the candidate geometries of the candidate set according to a ranking criteria, wherein the ranking sorts the candidate geometries according to the likelihood of the respective candidate geometry to be a true geometry of the first point of interest;
selecting, using one or more computing devices, a first candidate geometry of the candidate geometries of the candidate set as the true geometry for the first point of interest according to the ranking; and
storing, using one or more computing devices, the first candidate geometry in association with the first point of interest.

17. The machine-readable medium of claim 16, wherein the ranking criteria include one or more of whether the candidate geometry is extracted from a self-describing point of interest, name similarity of the candidate geometry and the first point of interest, the relationship type of the candidate geometry and the first point of interest, a global occupancy count of the candidate geometry, geometry type of the candidate geometry, distance from the coordinates associated with the candidate geometry to the first point of interest or a unique identifier associated with the candidate geometry.

18. The machine-readable medium of claim 16, wherein the one or more relationships comprises one of an occupies relationship indicating that the first point of interest occupies the candidate geometry or an is-contained-by relationship indicating that the first point of interest is contained inside the candidate geometry.

19. A machine-implemented method for determining a true geometry of a point of interest (POI), the method comprising:
identifying, using one or more computing devices, one or more geometries associated with one or more places according to one or more relationships;
generating, using one or more computing devices, a candidate set of geometries for a first place of the one or more places, the candidate set of geometries including one or more candidate geometries, wherein the one or more candidate geometries include one or more of the one or more geometries being associated with the first place according to the one or more relationships;
ranking, using one or more computing devices, the one or more candidate geometries of the candidate set according to a ranking criteria, wherein the ranking sorts the one or more candidate geometries according to the likelihood of a candidate geometry to be the true geometry of the place, wherein the ranking criteria includes an occupancy count for each candidate geometry of the one or more candidate geometries, wherein the occupancy count indicates the number of places of the one or more places being associated with the candidate geometry by the one or more relationships, and wherein the candidate geometry is more likely to be the true geometry of the first place if the occupancy count of the candidate geometry is smaller than the other candidate geometries of the one or more candidate geometries;
selecting, using one or more computing devices, a first candidate geometry of the one or more candidate geometries of the candidate set as the true geometry for the first place according to the ranking; and
storing, using one or more computing devices, the first candidate geometry in association with the first place.

* * * * *